June 17, 1969

F. THOMA 3,450,120

INSTALLATION FOR THE INJECTION OF FUEL
IN INTERNAL-COMBUSTION ENGINES

Filed June 27, 1967

INVENTOR
FRANK THOMA

BY *Dicke & Craig*
ATTORNEYS

United States Patent Office 3,450,120
Patented June 17, 1969

3,450,120
INSTALLATION FOR THE INJECTION OF FUEL IN INTERNAL COMBUSTION ENGINES
Frank Thoma, Stuttgart-Fasanenhof, Germany, assignor to Daimler-Benz Aktiengesellschaft, Stuttgart-Unterturkheim, Germany
Filed June 27, 1967, Ser. No. 649,348
Claims priority, application Germany, July 1, 1966, D 50,444
Int. Cl. F02m 59/46
U.S. Cl. 123—139                3 Claims

ABSTRACT OF THE DISCLOSURE

An installation for the injection of fuel in an internal-combustion engine which includes an injection pump equipped with a pump space and a relief valve downstream of the pump space, and which is additionally provided with a parallel connection of a check valve and of a throttle forming a so-called relief brake between the pump space and the beginning of the injection line on the pump side of the installation. The parallel connection constituting the relief brake may be arranged directly upstream or downstream of the relief valve or may be constituted by a self-contained adaptor which can be mounted as a self-contained unit on the pressure nipple of the injection pump.

Background of the invention

Figure 1:
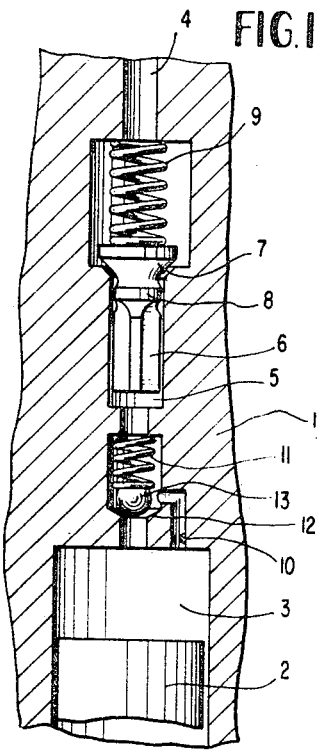

The present invention relates to an installation for the injection of fuel in an internal-combustion engine equipped with an injection pump which includes a relief valve between a pump space and the beginning of an injection line at the pump side.

Known fuel injection pumps of the prior art are equipped with so-called relief valves for purposes of achieving a low static pressure and therewith for purposes of avoiding after-injection, which relief valves withdraw by means of piston pieces at the stems of their valve bodies, after the termination of the fuel supply, a predetermined fuel quantity (relief volume) from the respective injection lines and the adjoining hollow spaces and supply the same back into the suction spaces of the injection pump. The valve bodies are thereby moved back very rapidly to the valve seats thereof after the termination of the supply primarily due to the rest or static pressure. A negative relief pressure wave is formed in the inection line after each supply pressure wave by the sudden opening of the cross section of the injection pump which permits the pressure to drop far below the rest or static pressure and possibly to the pressure zero which, in turn, entails the disadvantage that cavitation may occur. Furthermore, pressure waves which occur at the nozzles due to reflection and which flow back in the injection lines are reflected at the valve bodies, which have already fallen back against their valve seats, as well as at fixed walls so that a further pressure wave moves toward the nozzle which may have as a consequence a disadvantageous after-injection.

Summary of the invention

The present invention avoids the described disadvantages in that a parallel connection of a check valve and of a throttle as so-called relief brake is arranged between the pump space and the beginning of the injection line. It is thereby particularly advantageous that the relief brake is arranged in an injection pump containing the relief valve either directly in front (upstream) or to the rear (downstream) of the relief valve. However, it may also be advantageous, for example, for purposes of equipping an already existing installation, that the relief brake is arranged in an intermediate piece which is adapted to be inserted directly upstream of the beginning of the injection line on the pump side and is constructed as independent adaptor.

Accordingly, it is an object of the present invention to provide an injection pump for the injection of fuel in internal-combustion engines which avoids, by extremely simple and operationally reliable means, the aforementioned shortcomings and drawbacks encountered with the prior art constructions.

Another object of the present invention resides in an injection pump which is so constructed and arranged as to avoid reliably any after-injection of fuel.

A further obect of the present invention resides in a fuel injection pump for the injection of fuel in internal-combustion engines which not only avoids cavitation, but additionally minimizes the danger of undesired pressure waves in the injection lines due to reflections in the system.

Figure 2:
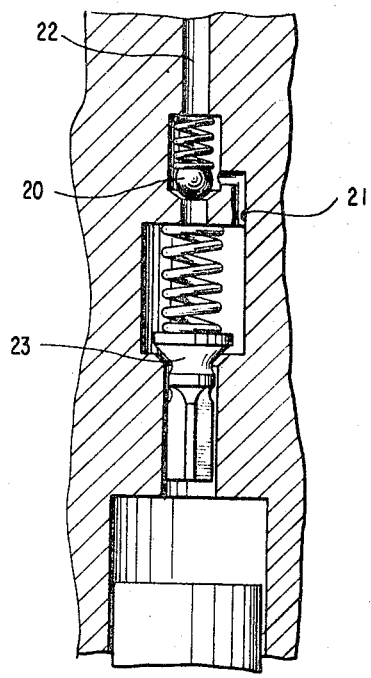
Figure 3:
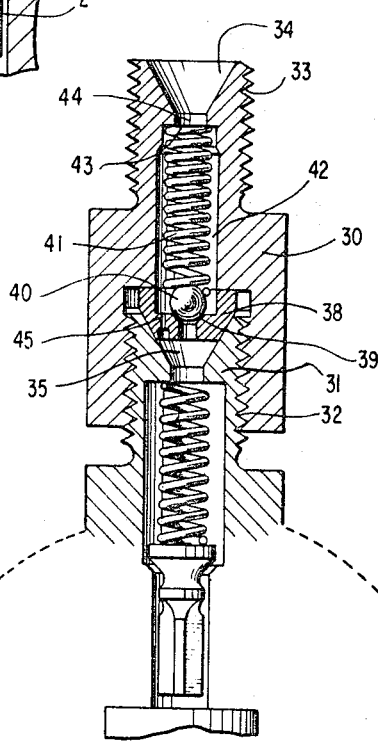

These and further objects, features, and advantages of the present invention will become more obvious from the following description when taken in connection with the accompanying drawing which shows, for purposes of illustration only, one embodiment in accordance with the present invention, and wherein:

FIGURE 1 is a somewhat schematic, partial cross-sectional view through a first embodiment of an injection pump according to the present invention and provided with a relief brake arranged between a relief valve and an injection line;

FIGURE 2 is a somewhat schematic, partial cross-sectional view through a second embodiment of an injection pump in accordance with the present invention in which a relief brake is arranged in the injection pump between a pump space and a relief valve; and FIGURE 3 is a somewhat schematic, partial cross-sectional view through a third embodiment of an injection pump in accordance with the present invention in which a relief brake is arranged in an intermediate piece constructed as independent or self-contained adaptor.

Referring now to the drawing and more particularly to FIGURE 1, reference numeral 1 designates therein an injection pump which is indicated only schematically and of which only those parts are shown that are of interest to the present invention, the remainder being of conventional construction. The injection pump 1 includes a pump space 3 accommodating therein a pump piston 2. The beginning of an injection line at the pump side is indicated in FIGURE 1 by reference numeral 4. The relief valve, which is arranged upstream of the pump-side beginning 4 of the injection line, includes a stem portion 6 which is of cross-shaped cross section and is guided in a channel 5, and a valve body arranged on the stem portion 6, which is constructed downstream of the valve surface 7 partly as suction piston 8. The relief valve is also under the influence of a return spring 9. A relief brake is arranged between the pump space 3 and the relief valve and is constituted by a parallel connection of a throttle 10 and a check valve which essentially consists of a ball 13 that is under the influence of a return spring 11 and is pressed against a conical valve seat 12.

During the supply, fuel flows from the pump space 3 by way of the open check valve 12, 13 and the open relief valve into the injection line whereby the suction piston 8 of the relief valve leaves and projects out of the channel 5 and thus valves the same in the opening sense. After the termination of the supply, fuel flows back from the injection line into the pump space 3 by reason of the static pressure whereby the check valve 12, 13 closes instantaneously. Consequently, the fuel which flows back has to pass through the throttle 10 so that a soft and smooth relief results and therewith a long, drawn-out relief wave.

Reflected pressure waves flowing back from an injection nozzle at a remote end of the injection line still find the relief valve 7 open so that they are reflected again only weakly from the throttle 10 toward the injection nozzle, whence they do not cause thereat any further after-injection. The largest portion of the reflected pressure wave reaching the throttle 10 passes through the throttle 10 and flows into the pump space 3.

The second embodiment differs essentially from the first embodiment in that a relief brake constituted by a check valve 20 with a throttle 21 connected in parallel therewith is arranged between a pump-side beginning 22 of an injection line and a relief valve 23.

In the third embodiment, a relief brake is arranged in an intermediate piece 30 constructed as a self-contained adaptor which is threaded on a pressure nipple or connecting piece 31 of an injection pump and is provided at its upper end with a thread 33 corresponding to the thread 32 of the pressure nipple or connecting piece 31 as well as with a sealing cone 34 which is able to accommodate or receive the pump-side beginning of an injection line and corresponds to a sealing cone 35 of the pressure nipple 31. The upstream area of an axial bore of the intermediate piece 30, offset three times in its diameter, is provided with an internal thread receiving the thread 32 of the pressure nipple 31, and contains at its bottom a valve bushing 38 of the relief valve whose upstream end is externally constructed of conical shape and abuts at the sealing cone 35 of the pressure nipple 31. A conical valve seat 39 on the inside of valve bushing 38 accommodates a valve ball 40 which is pressed by a return spring 41 against the valve seat 39. The center region 42 of the axial bore serves as housing for the return spring 41 which abuts against an end face 43 that is constituted by a downstream region 44 of the axial bore terminating in the sealing cone 34. A throttling bore 45 extends through the valve bushing 38 which is disposed parallel to the check valve constituted by the valve seat 39 and the valve ball 40. The arrangement of the relief brake within a self-contained adaptor has the advantage that existing injection pumps may be readily equipped with such relief brake.

While I have shown and described only one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:
1. In an installation for the injection of fuel in an internal-combustion engine having an injection pump including relief valve means disposed between a pump space and the beginning of an injection line at the pump side and having no originally-provided relief brake means, the improvement comprising an intermediate member constructed in the form of an independent adaptor which is adapted for insertion upstream of the beginning of the injection line on the pump side, said adaptor including relief brake means.

2. The improvement according to claim 1, wherein said relief brake means includes a check valve means and a throttle means operatively interconnected in parallel.

3. The improvement according to claim 1, wherein said relief brake means is arranged directly downstream of the relief valve means.

References Cited
UNITED STATES PATENTS

| | | |
|---|---|---|
| 2,729,169 | 1/1956 | Nichols. |
| 2,797,644 | 7/1957 | Hogeman. |
| 2,804,825 | 9/1957 | Mansfield et al. |
| 2,888,876 | 6/1959 | Nichols. |
| 3,364,863 | 1/1968 | Olszewski et al. _____ 103—41 |

FOREIGN PATENTS

| | | |
|---|---|---|
| 305,822 | 5/1955 | Switzerland. |
| 402,510 | 5/1966 | Switzerland. |

LEONARD H. GERIN, *Primary Examiner.*

U.S. Cl. X.R.

103—41